United States Patent [19]

Matsuda et al.

[11] Patent Number: 4,870,833

[45] Date of Patent: Oct. 3, 1989

[54] CAR AIR CONDITIONING APPARATUS AND CONTROLLING METHOD THEREFOR

[75] Inventors: Toshiharu Matsuda; Yoshinao Okumoto, both of Kudamatsu, Japan

[73] Assignee: Hitachi, Ltd., Tokyo, Japan

[21] Appl. No.: 86,829

[22] Filed: Aug. 19, 1987

[30] Foreign Application Priority Data

Aug. 27, 1986 [JP] Japan ................... 61-198835
Dec. 3, 1986 [JP] Japan ................... 61-286630

[51] Int. Cl.⁴ ................... B60H 1/32; F25B 49/00
[52] U.S. Cl. ................... 62/134; 62/228.4; 62/230; 62/243; 62/180
[58] Field of Search ............ 62/133, 134, 228.4, 62/230, 243, 180

[56] References Cited

U.S. PATENT DOCUMENTS 4,006,603  2/1977  Miles ................... 62/243 X
4,364,237  12/1982  Cooper et al. ........... 62/228.4 X
4,667,480  5/1987  Bessler ................. 62/228.4 X

FOREIGN PATENT DOCUMENTS 0018046  2/1983  Japan ................... 62/230

Primary Examiner—Harry B. Tanner
Attorney, Agent, or Firm—Antonelli, Terry & Wands

[57] ABSTRACT

The present invention aims at securing a steady air conditioning capacity regardless of any fluctuation in speed of an engine in a car air conitioning apparatus using the engine as a power source, which comprises a generator driven by a main engine, a compressor provided with a driving motor, a condenser, an expansion means, an evaporator, a condenser blower, an evaporator blower, and a power controlling means for controlling a power generated by the generator and feeding it to the compressor, condenser blower and evaporator blower.

7 Claims, 6 Drawing Sheets

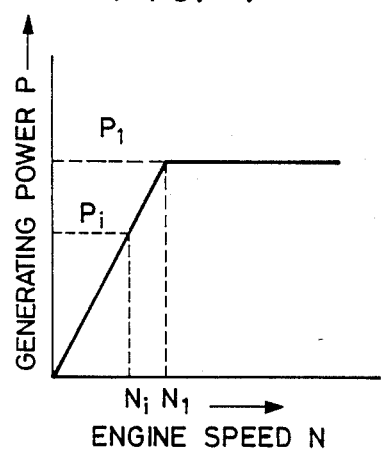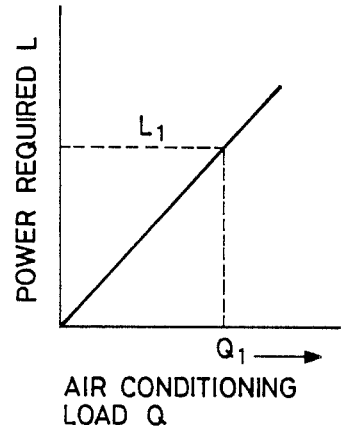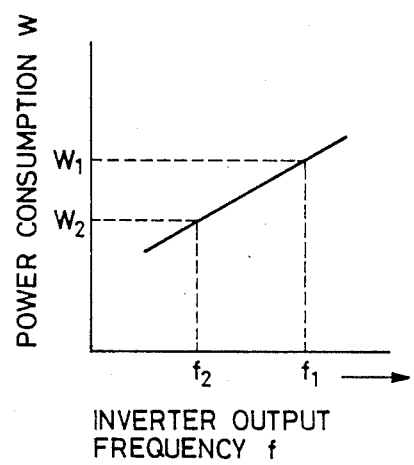

CAR AIR CONDITIONING APPARATUS AND CONTROLLING METHOD THEREFOR

BACKGROUND OF THE INVENTION

The present invention relates to an air conditioning apparatus mounted on cars, and is particularly concerned with a car air conditioning apparatus using an engine as power source and a controlling method therefor.

A prior art air conditioning apparatus mounted on a car having a main engine as the power source for driving, for example, a diesel car, bus or other vehicle comprises an open type compressor unit driven directly by the main engine, a condenser connected to the compressor unit, an expansion means, an evaporator, a condenser blower, an evaporator blower and other components. Then, for adjusting the capacity according to fluctuation in an air conditioning load, a clutch provided for power transmission between the main engine and the compressor is controlled intermittently, or a displacement of the compressor is changed. The apparatus of having been disclosed in Japanese Patent Laid-Open No. 59-109423 is known well as representing the prior art air conditioning apparatus described above.

Meanwhile, the main engine speed sharply changes according to a travelling state of the car itself. Concretely, the speed changes between 600 rpm and 1,800 rpm or so. Accordingly, a speed of the compressor driven directly by the main engine sharply fluctuates likewise as in the case of the main engine. Consequently, in the air conditioning apparatus having a refrigerant in a cycle circulated by the compressor, the capacity changes between 33% and 100%. Thus, in the prior art air conditioning apparatus, the air conditioning capacity sharply fluctuates, and a careful consideration cannot be given to a requirement for securing steady cooling capacity.

SUMMARY OF THE INVENTION

An object of the invention is therefore to provide a car air conditioner capable of securing a steady air conditioning capacity regardless of any fluctuation in speed of an engine or power source.

One mode of carrying out the invention comprises a generator driven by a main engine, a compressor provided with a driving motor, a condenser, an expansion means, an evaporator, a condenser blower, an evaporator blower, and a control means for controlling a power generated by the generator and feeding the power to the compressor motor, the condenser blower and the evaporator blower.

Further, another mode of carrying out the invention comprises a generator driven by a main engine, a compressor provided with a driving motor, a condenser, an expansion means, an evaporator, a condenser blower, an evaporator blower, an inverter for controlling the frequency of a power generated by the generator and feeding the power to the compressor motor, and is characterized in that the power generated by the generator is detected, and when the generated power is detected to have reached a value whereat the compressor cannot be operated any further, thereby lowering an output frequency of the inverter.

Further objects and features of the invention will be made clear from the following description.

BRIEF DESCRIPTION OF THE DRAWINGS

FIG. 7 is a graph indicating a relation between a main engine speed N and a power P generated by a generator of the air conditioning apparatus in FIG. 6.

FIG. 8 is a graph indicating a relation between an air conditioning load Q and a required power L of the air conditioning apparatus in FIG. 6.

FIG. 9 is a graph indicating a relation between an output frequency f of an inverter and a power consumption W of the air conditioning apparatus in FIG. 6.

DETAILED DESCRIPTION OF PREFERRED EMBODIMENTS

Figure 1:
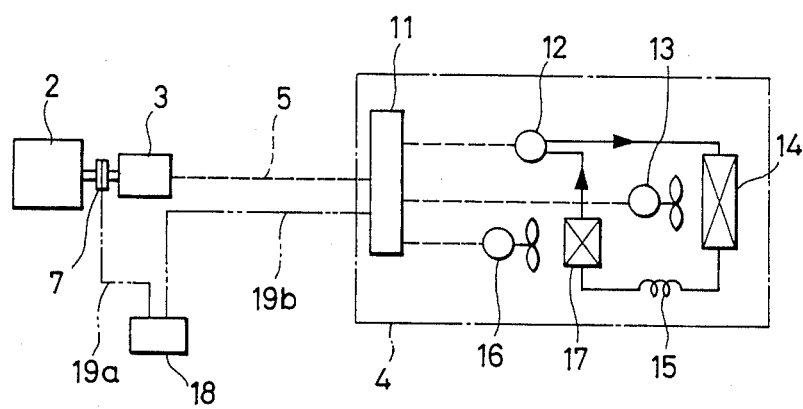
FIG. 1 is a circuit diagram showing a refrigerating cycle and control system of an air conditioning apparatus given in one embodiment of the invention.
Figure 2:
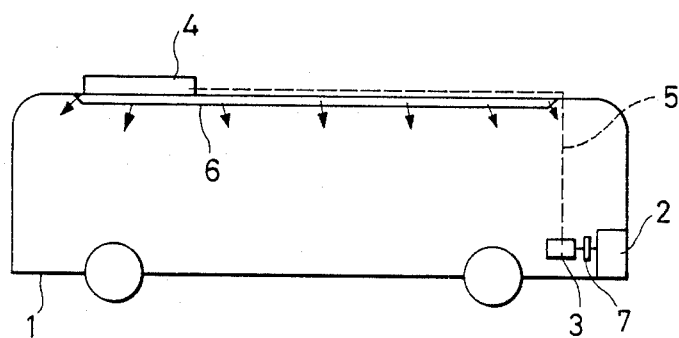
FIG. 2 is a side view of a bus provided with the air conditioning apparatus of FIG. 1, which is an applied example of the invention.

The invention will now be described in detail with reference to the accompanying drawings. FIG. 1 is a circuit diagram showing a refrigerating cycle and a control system of an air conditioning apparatus given in one embodiment of the invention. Then, FIG. 2 is a side view of a bus provided with the air conditioning apparatus of FIG. 1, which is an applied example of the invention. In the drawings, 1 denotes a bus provided with a car air conditioner according to one embodiment of the invention, 2 denotes a main engine provided for driving the bus 1. A reference numeral 3 denotes a generator with a driving shaft coupled to the main engine 2 through an electromagnetic clutch 7. A reference numeral 4 denotes an air conditioning unit provided with the equipment forming a refrigerating cycle, and numeral 5 denotes an electric wiring connecting the air conditioning unit 4 and the generator 3. A reference numeral 6 denotes an air conditioning duct provided on a top or roof of the bus 1, which communicates with the air conditioning unit 4 and feeds a conditioned air obtainable through the air conditioning unit 4 into a room. A reference numeral 11 denotes an inverter corresponding to a power control means for regulating the frequency of a power generated by the generator 3, feeding that power to each piece of equipment of the air conditioning unit 4, and controlling a rotational frequency of a motor drive by the power. A reference numeral 12 denotes a compressor constituting a refrigerating cycle, which is a hermetically sealed type having a driving motor within a casing enclosing the body. A reference numeral 14 denotes a condenser, 17 denotes an evaporator, and a condenser blower 13 and an evaporator blower 16 are provided correspondingly thereto. A reference numeral 15 denotes an expansion device provided in the refrigerating cycle of the condenser 14 and the evaporator 17. Then, the compressor 12, the condenser blower 13 and the evaporator blower 16 are operated on the power having a frequency regulated by the inverter 11 and obtained through the generator 3. A reference numeral 18 denotes a control panel for controlling the inverter 11 and the electromagnetic clutch 7, which is connected to the inverter 11 and the electromagnetic clutch 7 through electric wirings 19a, 19b.

Referring to the operation mode in such construction, when a driver of the bus 1 operates the control panel 18 to command a start of operation of the aforementioned air conditioning apparatus under the state where the main engine 2 has been actuated, the command is transferred to the electromagnetic clutch 7 and the inverter 11 through the electric wirings 19a, 19b, thus starting the operation. When the electromagnetic clutch 7 is actuated, the generator 3 is driven by the main engine 2, thus generating power. Then, since the power obtained through the generator 3 has its frequency fluctuated according to a rotational frequency of the main engine 2, it is fed to the inverter 11 to maintain an appropriate frequency. The compressor 12, the condenser blower 13 and the evaporator blower 16 are operated at a required speed on the supplied power having the frequency regulated appropriately as described. When the compressor 12 is operated, a refrigerant circulates through the condenser 14, the expansion means 15 and the evaporator 17 to bring about an air conditioning action at the evaporator 17. Then, a power control means for controlling the motor speed through detecting an output frequency of the generator 3 and changing pole of the motor to be driven may be provided instead of the inverter controller 11.

According to such construction since the compressor 12 is not driven directly by the main engine 2, a capacity of the air conditioning apparatus will not be influenced by a traveling state of the bus 1. That is, if a generating capacity of the generator 3 can be secured to some degree even under the state where the main engine speed drops, a speed of the compressor 12 and others can be kept as rated there around. In other words, the frequency can be raised to a predetermined value by the inverter 11 even when the main engine speed drops. Accordingly, an operation corresponding to an air conditioning capacity or load required to the air conditioning unit 4 will be secured. On the other hand, when the main engine 2 runs at high speed but the air conditioning capacity required for the air conditioning unit 4 is unmatched to a low air conditioning load, the frequency of the electric power is regulated by the inverter controller 11 and the power input is the unit 4 will be lowered, thereby preventing overcooling and the like.

According to such construction, furthermore, a system wherein the generator 3 is driven by the main engine 2 and power generated by the generator 3 is fed to the air conditioning unit 4 may be employed, thereby using a compressor 12 of the hermetically sealed type with the driving motor and the compressing mechanism contained within a casing. In the air conditioning unit 4 using such compressor 12, since pipings are ready for brazing all within the air conditioning unit 4, the refrigerating cycle can be hermetically sealed full. Accordingly, a complicated program for maintenance and checking such as supplementary feed of a refrigerant, replacement of a sealing member and the like will not be required in conjunction with a refrigerant leak from the refrigerating cycle. Still further, according to the aforementioned construction, it is unnecessary for the compressor 12 to be provided near and correspondingly to the main engine 2, therefore piping for connecting to the condenser 14 or the evaporator 16 can be shortened, and the air conditioning unit 4 including the compressor 12 can be formed compactly as a whole. Further, the pipings can all be connected through brazing, and hence a program for retightening and checking the pipings is no longer necessary.

Figure 3:
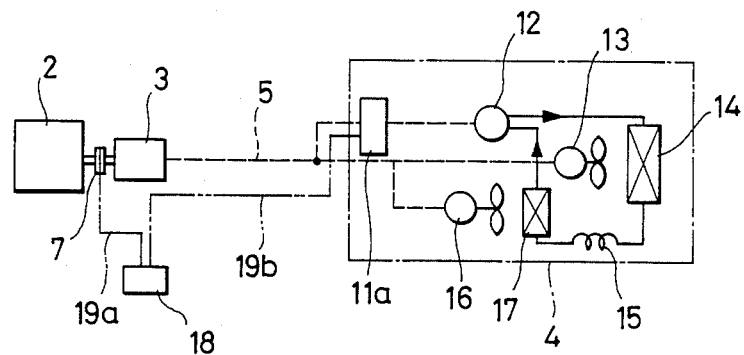
FIG. 3, FIG. 4, FIG. 6 and FIG. 10 are circuit diagrams showing a refrigerating cycle and a control system of air conditioning apparatus given in other embodiments of the invention.

Next, FIG. 3 is a circuit diagram representing another embodiment of the invention. In FIG. 3, like reference characters represent like members in the FIG. 1 embodiment described above. What is different from the aforementioned FIG. 1 embodiment is that when power generated by the generator 3 is fed to the air conditioning unit 4, the power is fed directly to the condenser blower 13 and the evaporator blower 16 and not through the inverter, and to the compressor 12 only the power having the frequency regulated is fed through an inverter 11a. Accordingly, only for the compressor 12, a frequency of the power fed is regulated by the inverter 11a, and a capacity can be controlled.

According to such construction, the condenser blower 13 and the evaporator blower 16 which do not exert a big influence on the air conditioning capacity will be operated at a speed according to a frequency of the power generated by the generator 3, but only the compressor 12 which does exist a big influence on the air conditioning capacity will be speed controlled according to the air conditioning capacity required.

According further to such construction, a small capacity will be quite acceptable for the inverter 11a, and an operation controlling equipment or a control action may be simplified in addition to an effect of the aforementioned FIG. 1 embodiment.

Figure 4:
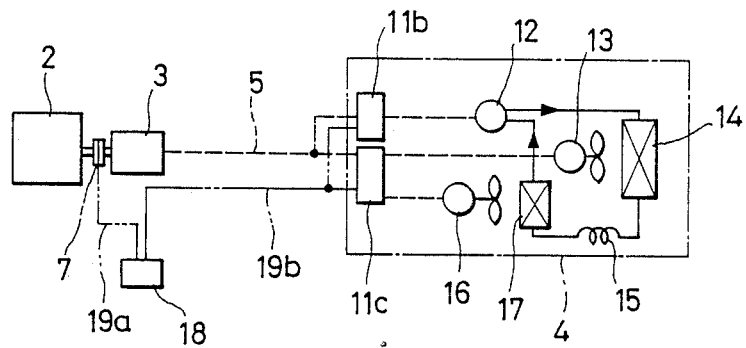

Next, FIG. 4 is a circuit diagram representing a further embodiment of the invention. In FIG. 4, like reference characters represent like members in the FIG. 1 embodiment described above. What is then different from the aforementioned FIG. 1 embodiment is that there are provided individually an inverter 11b for regulating a frequency of the power generated by the generator 3 and fed to the compressor 12, and an inverter 11c for regulating a frequency of the power generated by the generator 3 and fed to the condenser blower 13 and the evaporator blower 16.

According to such construction, the compressor 12, the condenser blower 13 and the evaporator blower 16 can be controlled to each independent operating state. Accordingly, a scope of application as an air conditioning apparatus can be enlarged. For example, if the capacity of the condenser blower 13 and the evaporator blower 16 is controlled equivalently to or lower than the capacity of the compressor 12, then a blast to the condenser 14 and the evaporator 17 is less than a rate of circulation of the refrigerant in the refrigerating cycle, therefore an evaporation temperature of the refrigerant is lowered, and thus a condition approximately a dehumidifying operation will be secured. Further, if the capacity of the compressor 12 is controlled to be lower than the capacity of the condenser blower 13 and the evaporator blower 16, the rate of refrigerant circulation is less than the blast fed to the condenser 14 and the evaporator 17, and thus the operating condition wherein a general capacity of the air conditioning apparatus is suppressed will be obtainable for operation.

Figure 5:
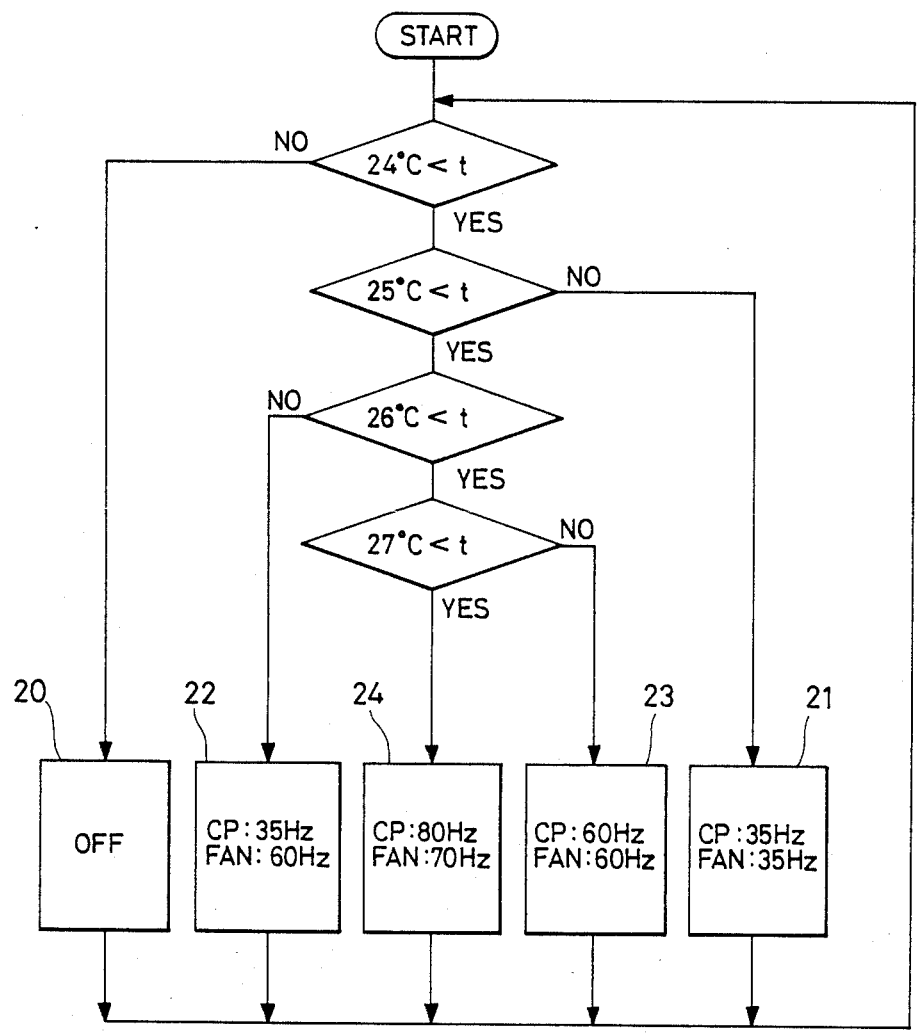
FIG. 5 is a flowchart showing the content of a control operation by a microcomputer controlling an inverter controller.

In the embodiment described with reference to FIG. 4, it would be complicated and burdensome for drivers to command and control individually each speed of the compressor 12, the condenser blower 13 and the evaporator blower 16 separately on the control panel 18. Now, therefore, it is effective that a microcomputer is connected to the control panel 18, a result obtained by inputting a detected control temperature in a passenger's room or space to be air conditioned through a temperature sensor, thereby controlling operation of the air conditioning apparatus. FIG. 5 is a flowchart representing one example of the arithmetic operation carrier out by the microcomputer. A set target temperature and frequency set points of the compressor, the condenser blower and the evaporator blower in FIG. 5 are such ones as will be modified according to type and capacity. In FIG. 5, "t" represents a temperature of the space to be air conditioned which is detected on the temperature sensor. Then, temperatures 24° C., 25° C., 26° C., 27° C. are targets set for controlling the air conditioning unit 4, 20 represents a control state where the operation is suspended at 24° C. or below in the detection temperature "t", and 21 represents a control command for dehumidifying operation at temperatures over 24° C. up to 25° C., or outputting a frequency value of the power to be fed to the compressor, the condenser blower and the evaporator blower for dehumidifying operation. Next, where the detection temperature "t" comes over 25° C. up to 26° C., a control output 22 is generated to provide smaller cooling capacity, where "t" comes over 26° C., up to 27° C., a control output 23 necessary for cooling operation at half capacity half or so of the capacity is generated, and where reaching over 27° C., a control output 24 necessary for cooling operation at maximum capacity of the air conditioning unit is generated.

According to such construction, since operation of the air conditioning unit can be controlled automatically correspondingly to a temperature change in the space for air conditioning, it is unnecessary for drivers to operate the control panel 18 so often. Accordingly, drivers will be burdened less thereby.

Figure 6:
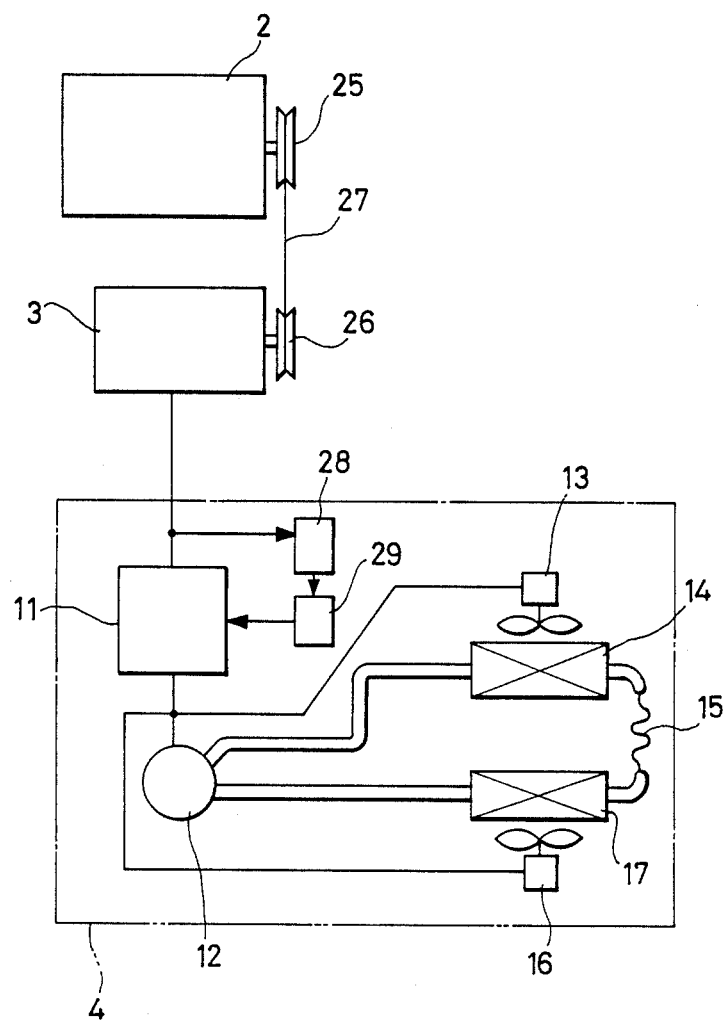

Next, FIG. 6 is a circuit diagram representing a further embodiment of the invention. FIG. 7 is a graph indicating a relation between a main engine speed N in the air conditioning apparatus shown in FIG. 6 and a power P generated by the generator. FIG. 8 is a graph indicating a relation between an air conditioning load Q in the air conditioning apparatus show in FIG. 6 and a required power L. FIG. 9 is a graph indicating a relation between an output frequency f of an inverter in the air conditioning apparatus shown in FIG. 6 and a power consumption W. An embodiment varying from each of the aforementioned embodiments of the invention will be described with reference to FIGS. 6 to 9. In FIG. 6, like reference characters represent like members given in the aforementioned embodiments. First, what is different in construction from each of the aforementioned embodiments will be taken up for description. The generator 3 of this embodiment is driven by the main engine 2, and is so coupled thereto not through an electromagnetic clutch but through a pulley 25, a pulley 26 and a belt 27. Then, there is provided a voltage detector 28 for detecting a voltage of the power generated by the generator 3. A result detected by the voltage detector 28 is output to a controller 29 connected to the voltage detector 28. With the result obtained through the voltage detector 28 as a control input, the controller 29 outputs a command for lowering a frequency of the power fed to the compressor 12, the condenser blower 13 and the evaporator blower 16 to the inverter 11 when the detection result is lower than a set point. That is, in case the main engine speed drops to cause a deterioration in the power generated by the generator 3, a power fed to the compressor 12, the condenser blower 13 and the evaporator blower 16 from the inverter controller 11 also deteriorates, therefore the air conditioning unit 4 cannot be operated for a large air conditioning load. Then, with a voltage value of the power generated by the generator 3 as the set point, the controller 29 outputs a control command for lowering the output power to the inverter 11 when the detection result of the voltage detector 28 falls below the set point.

In such construction, the operating condition will be described. A rotational frequency of the main engine 2 changes from a low speed (idling being 500 to 600 rpm) to a high speed (1,800 rpm or so in the case of rail car). A rotational power of the main engine 2 is transferred to the generator 3 through the pulley 3, the belt 5 and the pulley 4. A frequency of the power generated by the generator 3 changes according to the rotational frequency. The generated power is fed to the inverter 11, where it is converted to a constant frequency, the frequency is controlled and then fed to the compressor 12, the condenser blower 13 and the evaporator blower 16. According to such construction, a three-phase AC power is obtainable normally on an output side of the inverter 11, and thus an ordinary type of AC motor can be used for the compressor 12, the condenser blower 13 and the evaporator blower 16. Accordingly, a hermetically sealed compressor 12 can be used.

On the other hand, as for the refrigerating cycle, a high-temperature and high-pressure gas refrigerant coming out of the compressor 12 returns to the compressor 12 by way of the condenser 14, the expansion means 15 and the evaporator 17, thus circulating around the path. Then in the evaporator 17, a circulating air from inside the car which is fed into the car or space for air conditioning or a fresh air let in from outside the car is subjected to a heat exchange with the refrigerant to obtain a conditioned air. The conditioned air is then fed into the car or space for air conditioning.

Next, a control action of the controller 29 will be described. With reference first to a relation between the speed N of the main engine 2 and the power P generated by the generator 3, it is generally designed that a predetermined power $P_1$ is obtainable at or over a speed $N_1$ higher than a speed $N_i$ at the time of idling. Then, if it is designed that the power $P_1$ is obtainable from the speed $N_i$ at the time of idling, a big-sized generator 3 must be provided, and if so, then such a restriction is too influential to mount it on a car in respect of the space for installation or the weight.

Then, a relation between the air conditioning load Q in the car such as rail car or the like and the power L required for operating the air conditioning unit 4 is as shown in FIG. 8, and a relation between the output frequency f of the inverter 11 and the power consumption W of the air conditioning unit 4 is as shown in FIG. 9. Now, let it be assumed that the air conditioning load is $Q_1$ and the then required power is $L_1$. In this case, if the main engine 2 is kept idling when the car is stopping or coasting, then a relation between the generated power and the required power is $P_i < L_1$, and since the required power $L_1$ exceeds a generating capacity $P_1$ of the generator 3, a voltage drop results in a discontinuous operation. Then, an output voltage of the generator 3 is detected by the voltage detector 28, and when it falls below the set point, a control command for lowering the output frequency to $f_2$ from $f_1$ is output to the inverter 11 from the controller 29. The inverter 11 then lowers the output frequency $f_1$ to $f_2$ according to the control command, therefore a speed of the compressor 12 drops and the power consumption for operation of the air conditioning unit 4 is decreased from $W_1$ to $W_2$. Thus, for controlling the power to be fed to the air conditioning unit 4, the power generated by the generator 3 comes to exceed the power consumption of the air conditioning unit 4 all the time, thereby keeping up the operation. Here, if $f_1$ and $f_2$ are set so as to have $W_1 = L_1 \leq P_1$, $W_2 \leq P_i$, the power consumption will never exceed the power generated by the generator 3 from controlling the power consumption of the air conditioning unit 4 despite fluctuation in speed of the generator 3, thus keeping up operation of the air conditioning unit 4.

According to such construction, a hermetically sealed compressor 12 can be employed, therefore a refrigerant leak will never arise from the compressor 12, and thus work for maintenance or checking the air conditioning apparatus can be omitted. Further, operation can be kept going by controlled positively an operating frequency of the air conditioning unit 4 through detecting an output voltage of the generator 3 even in case the air conditioning load or the speed of the main engine 2 fluctuates, and also a large-sized generator can be avoided. Meanwhile, a voltage of the power generated by the generator 3 is detected by the voltage detector 28 in the foregoing embodiments; however, a means for detecting the power generated by the generator 3 may be used instead of the voltage detector 28, and then a similar effect will be obtainable from that of outputting a control command equivalent to the controller 29 to the inverter 11 by changing the set point correspondingly thereto.

Figure 10:
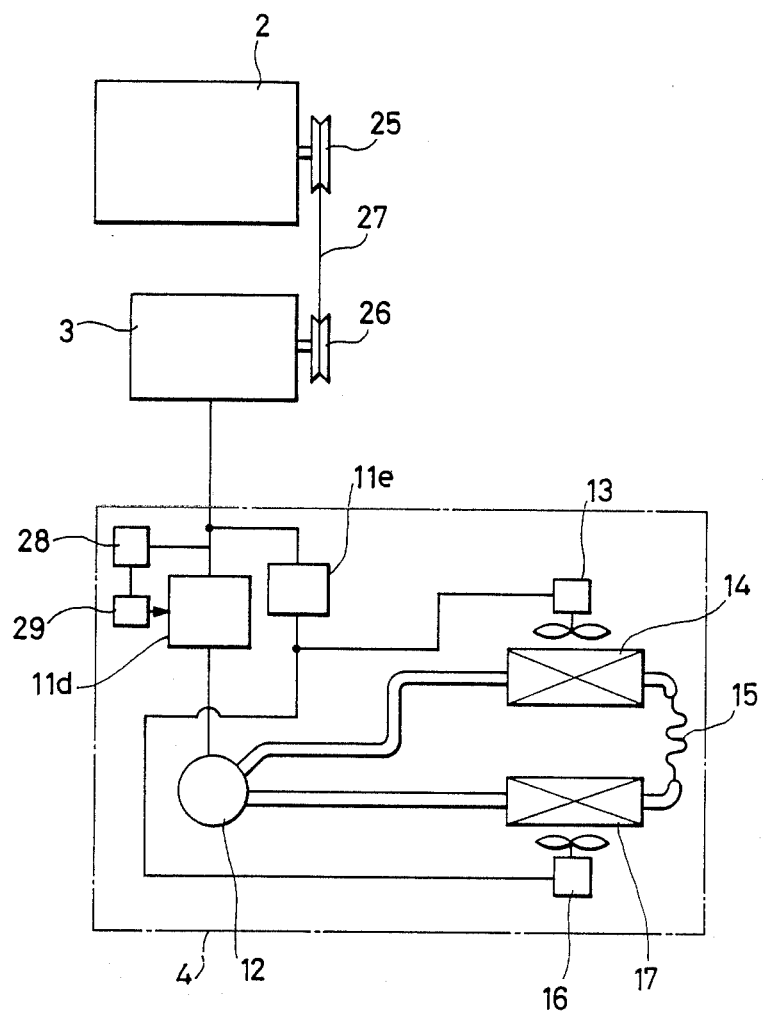

Next, FIG. 10 is a circuit diagram representing a still further embodiment of the air conditioning equipment according to the invention. In FIG. 10, like reference characters represent like members in the aforementioned embodiments. In the present embodiment, what is different from the embodiment given in FIG. 6 is that an inverter 11d is provided for the compressor 12 and another inverter 11e is provided for the condenser blower 13 and the evaporator blower 16.

As for the inverter 11d, the voltage detector 28 and the controller 29 are provided as in the case of embodiment given in FIG. 6, and in case the generating power of the generator 3 falls below the set point, an output frequency of the inverter 11d is lowered. Then in the case of the inverter 11e, the voltage detector 28 and the controller 29 are not provided therefor, and the power is fed to the condenser blower 13 and the evaporator blower 16 at a constant frequency at all times.

According to such construction, an inverter of large capacity will not be required by dividing the power control means into two like inverters 11d and 11e. Further, since an output frequency of the inverter 11e is constant at all times, a speed of the condenser blower 13 and the evaporator blower 16 is constant at all times, thus making the blast rate constant.

Meanwhile, in each embodiment described above, an air cooler has been taken up for description as the air conditioning unit; however, the invention is not necessarily limited thereby, and a similar effect is obtainable in an air conditioning apparatus wherein discharge side and suction side of a compressor of the air conditioning unit are connected to a fourway type change-over valve, and a heat pump cycle whereby a refrigerant is capable of flowing backward through a circulating path of condenser, expansion means and evaporator is provided as an air conditioning unit.

As described above, according to the invention, a steady air conditioning capacity of the air conditioning apparatus can be secured regardless of fluctuation in speed of the engine which is a power source of the air conditioning apparatus.

What is claimed is:

1. A car air conditioning apparatus, comprising:
   a generator driven by a variable rotational speed main engine for running a car,
   a compressor provided with a driving motor,
   a condenser,
   an expansion means,
   an evaporator,
   a condenser blower provided with a motor,
   an evaporator blower provided with a motor, and
   an inverter controlling means for supplying electric power generated by said generator to said compressor driving motor, condenser blower motor and evaporator blower motor, and for decreasing the frequency of the electric power supplied to said compressor driving motor, condenser blower motor and evaporator blower motor when the total power consumed in said compressor driving motor, condenser blower motor and evaporator blower motor exceeds the power generated by said generator.

2. The car air conditioning apparatus as defined in claim 1, wherein said inverter controller means comprises an inverter controller for the compressor individually capable of adjusting output frequencies and supplying the electric power to the compressor driving motor, and an inverter controller for the blower individually capable of adjusting output frequencies and supplying the electric power to both the blower motor for the condenser and the blower motor for the evaporator.

3. A car air conditioning apparatus, comprising:
   a generator driven by variable rotational speed main engine for running a car,
   a compressor provided with a driving motor,
   a condenser,
   an expansion means,
   an evaporator,
   a condenser blower provided with a motor,
   an evaporator blower provided with a motor, and
   an inverter controller means for supplying electric power generated by said generator to said compressor driving motor, condenser blower motor and evaporator blower motor and for decreasing the frequency of the electric power supplied to said compressor driving motor, condenser blower motor and evaporator blower motor, when the total power consumed in said compressor driving motor, condenser blower motor and evaporator blower motor is detected at a certain time interval between points of time and the detected value exceeds the electric power generated by said generator at the time interval.

4. A car air conditioning apparatus, comprising:
   a generator driven by a variable rotational speed main engine for running a car,
   a compressor provided with a driving motor,
   a condenser,
   an expansion means,
   an evaporator,
   a condenser blower provided with a motor supplied with electric power directly and constantly from said generator, an evaporator blower provided with a motor supplied with electric power directly and constantly from said generator, and an inverter controller means for supplying the electric power generated by said generator to said compressor driving motor and for decreasing the frequency of the electric power supplied to said compressor driving motor, when the total power consumed in said compressor driving motor, condenser blower motor and evaporator blower motor exceeds the electric power generated by said generator.

5. A car air conditioning apparatus, comprising:
a generator driven by a variable rotational speed engine,
a compressor provided with a driving motor,
a condenser,
an expansion means,
an evaporator, and
inverter controller means for supplying electric power generated by said generator to said compressor driving motor, condenser blower motor and evaporator blower motor and for decreasing the frequency of the electric power supplied to said compressor driving motor, condenser blower motor and evaporator blower motor, when the total power consumed in said compressor driving motor, condensor blower motor and evaporator blower motor exceeds the electric power generated by said generator.

6. The car air conditioning apparatus as defined in claim 5, wherein said inverter controller means comprises an inverter controller for the compressor individually capable of adjusting output frequencies and supplying the electric power to the compressor driving motor, and an inverter controller for the blower individually capable of adjusting output frequencies and supplying the electric power to both the blower motor for the condensor and the blower motor for the evaporator.

7. A car air conditioning apparatus, comprising:
a generator driven by a variable rotational speed main engine for running a car,
a compressor provided with a driving motor,
a condenser,
an expansion means,
an evaporator,
a condenser blower provided with a motor,
an evaporator blower provided with a motor,
a voltage detector for detecting the voltage of electric power generated by said generator,
a controller for outputting a control command in response to the signal of a voltage drop issued from said voltage detector, and
an inverted controller means for decreasing the frequency of the electric power supplied from said generator to said compressor driving motor, condensor blower motor and evaporator blower motor in compliance with a control command issued from said controller.

* * * * *